United States Patent [19]
Adkins et al.

[11] 3,725,333
[45] Apr. 3, 1973

[54] METHOD FOR PRODUCING FOUNDRY MOLDS AND FOUNDRY MOLDING COMPOSITIONS

[75] Inventors: William B. Adkins, Sidney; Thomas F. Bauer, Bainbridge; James O. Beane, Sidney, all of N.Y.

[73] Assignee: Borden Inc., New York, N.Y.

[22] Filed: Apr. 20, 1970

[21] Appl. No.: 30,259

[52] U.S. Cl. ...................260/38, 164/43, 260/56, 260/829, 260/DIG. 40
[51] Int. Cl. .............................................C08g 5/04
[58] Field of Search...........260/38, DIG. 10, 829, 56; 164/43

[56] References Cited

UNITED STATES PATENTS

| | | | |
|---|---|---|---|
| 2,708,622 | 5/1955 | Stone | 260/38 X |
| 2,970,121 | 1/1961 | Schmittberger | 260/38 X |
| 3,024,215 | 3/1962 | Freeman et al. | 260/DIG. 10 |
| 3,247,556 | 4/1966 | Buell et al. | 164/43 X |
| 3,274,048 | 9/1966 | Armour et al. | 161/184 |
| 3,312,650 | 4/1967 | Case et al. | 164/43 X |
| 2,471,631 | 5/1949 | Lebach | 260/829 X |
| 2,673,190 | 3/1954 | Dietz | 260/56 X |

FOREIGN PATENTS OR APPLICATIONS 1,156,941   11/1963   Germany..............................260/829

OTHER PUBLICATIONS

T. S. Carswell, Phenoplasts, Interscience Publishers, Inc., 1947. (vol. VII of High Polymers Series), pp. 9–11. (Sci Labr. TP986.P4C3, Copy in A.V.145).

*Primary Examiner*—Morris Liebman
*Assistant Examiner*—S. M. Person
*Attorney*—George P. Maskas, Edward L. Mandell and George A. Kap

[57] ABSTRACT

Foundry molding composition is prepared by mixing a granular refractory material, such as sand, with a curing agent and a phenol-formaldehyde resin binder which has been modified with 10–70 percent, based on the weight of the resin, of furfural or furfuryl alcohol. The molding composition is blown into a pattern box preheated to 350°–600°F and cures in less than 60 seconds. The molds prepared from this molding composition demonstrate good resistance to water pick-up, have higher initial tensile strengths, much better retained strengths and do not impart pinholing effect to the castings manufactured therewith.

2 Claims, No Drawings

METHOD FOR PRODUCING FOUNDRY MOLDS AND FOUNDRY MOLDING COMPOSITIONS

This invention relates to the method of producing foundry molds and to foundry molding compositions characterized by a binder which essentially is a phenol-formaldehyde resin modified with furfuryl alcohol or furfural. The binder is a hot box binder which is adapted for use in conjunction with the hot box method of producing molds. As used herein, the term "molds" refers to molds as well as cores.

An examplary molding composition includes sand; about 2 percent of a hot box binder, based on the weight sand; and about 20 percent of a curing agent, based on the weight of the binder. The curing agent is added to the sand and mulled for a period of about 15 seconds to 3 minutes, depending on the speed of the muller. The hot box binder is then added and mulling is continued for an additional 60 seconds to 4 minutes.

The sand mold is made by blowing the coated sand molding composition into a pattern preheated to between 350°F and 600°F. The molding composition is held in the pattern for a period of time not exceeding 60 seconds, following which, the mold is extracted from the pattern. Blow pressures vary from 70 to 100 lbs.

This disclosure focuses attention on two main problems prevalent in the field of foundry sand molds:

1. pinhole porosity encountered in castings, such as iron and steel castings, produced in molds containing the presently available binders; and
2. water pick-up or hygroscopicity of these binders.

Water pick-up by the binder is deleterious to a foundry sand mold containing the binder since it weakens the bond between sand granules thus resulting in a mold which would not be able to permit casting of the metal therein. Pinholing is a serious problem since it weakens the metal casting. This is particularly true of castings which have rigid specifications. These castings are totally x-rayed and the presence of pinholes results in rejection of the casting.

The invention described herein relates to a method of producing foundry sand molds and to foundry sand molding compositions which have the attribute of imparting a greater water resistance to the molds produced in accordance with the invention and the attribute of eliminating pinholing in the castings manufactured in molds made from the compositions and pursuant to the method described herein.

Pursuant to the invention described herein, the binder, consisting of phenol-formaldehyde resin and furfuryl alcohol, is prepared by condensing phenol with formaldehyde in presence of a catalyst, such as calcium hydroxide, and then modifying the resin condensate with furfuryl alcohol or furfural. The condensation reaction is carried out at a temperature of from 60° to 100°C at a pH of 7.5–9.5, with the phenol to formaldehyde mole ratio (P/F) of from 1:1 to 1:3. Amount of the furfuryl alcohol or furfural in the binder may vary from 10–70 percent, and preferably from 25 to 45 percent, based on the weight of the resin. Amount of the catalyst may vary from 0.005 to 4.5 percent, and preferably from 0.1 to 1.3 percent, based on the weight of the phenol-formaldehyde resin. When the condensation reaction is complete, the pH of the solution is adjusted with a mineral acid to within the range of 4.0–7.0 and water is removed by distillation to the desired end point.

In preparing a sand molding composition with the binder described above, sand is mixed with the curing agent and the mixture is mulled long enough for the curing agent to be evenly distributed throughout the sand. This mulling time may vary from 15 seconds to 3 minutes, but is preferably in the range of 30 seconds to 2 minutes, depending on the speed of rotation of the muller. Following this, the binder is added to the sand and curing agent mixture and this mixture is then mulled for a period varying from 30 seconds to 5 minutes, and preferably from 60 seconds to 4 minutes, depending on the speed of the muller, to insure proper coating of the sand grains. Amount of the binder in the molding composition may vary from 1 to 8 percent, and preferably from 1.5 to 3.0 percent, based on the weight of sand. The curing agent may be used in an amount of from 10 to 30 percent, and preferably from 12 to 25 percent, based on the weight of the binder. Up to a couple of percent of iron oxide, $Fe_2O_3$, may be added to the sand in the muller for imparting to the mold resistance to heat degradation.

Foundry sand mold is produced by preheating the pattern to a temperature in the range of 350°–600°F and then blowing the sand mixture into the pattern box. As a result of the heat supplied by the heated pattern, the binder cures quickly and the mold may be extracted from the pattern in less than 60 seconds.

The essential components of the binder are phenol-formaldehyde resin, furfuryl alcohol or furfural and an acidic curing agent. In addition to sand, and particularly foundry sand, other non-absorbing granular refractory materials can be used, examples of which are carborundum, emery, glass and metal powders. Although phenol and formaldehyde are preferred condensation reactants, other substances may be used. For instance, phenol may be substituted with cresols, xylenols, mixture of cresols and xylenols and epoxy resins such as the condensation products of bis-phenol with epichlorohydrin; and formaldehyde can be substituted by other water-soluble and phenol-reactive aldehydes such as acetaldehyde and propionaldehyde. When formaldehyde is used, it can be used in the form of 37, 44 or 50 percent aqueous solutions. In addition to calcium hydroxide, other suitable catalysts are sodium hydroxide, barium hydroxide, potassium hydroxide and other basic materials. Since furfural has similar properties to that of furfuryl alcohol, it may be substituted for furfuryl alcohol.

The preferred phenol-formaldehyde resins are the resoles or A-stage phenolic resins. These resins contain comparatively short molecules that are fusible and soluble in both water and conventional solvents. The B-stage phenolic resins, or resitoles, are obtained by allowing the condensation reaction of phenol with formaldehyde to continue until higher molecular weight, mildly cross-linked resins are obtained which are still fusible and soluble in conventional organic solvents, such as acetone, but which are no longer soluble in water or alkali solutions. The resitoles may also be used in the invention described herein.

Various curing agents may be used for preparing sand molding compositions which have improved water-resistance and which minimize the pinholing effect in the castings. Examples of such acidic curing agents are the following:

| | |
|---|---|
| aluminum chloride | chromium nitrate |
| ferric chloride | zinc chloride |
| ferric nitrate | aluminum sulfate |
| ammonium nitrate | sulfuric acid |
| para toluene sulfonic acid | |

The curing agent is preferably used in a formulation with urea and water. The curing formulation is prepared by charging the curing agent, urea and water into a vessel and slightly warming the mixture, while agitating, until the ingredients go into solution. An examplary curing formulation includes 7-25 percent of a curing agent, 15-25 percent urea and remainder, water. A preferred curing formulation includes 38 percent of a 50 percent aqueous solution of chromium nitrate, 40 percent urea and remainder, water.

Chromium nitrate is a superior curing agent. Comparison tests with other curing agents have indicated that sand molds prepared with chromium nitrate exhibit greater initial tensile strengths and much better retained strengths in a very humid atmosphere. Castings made in sand molds utilizing chromium nitrate as the curing agent exhibited substantially no pinholing effect.

To describe the method more specifically, the resin is prepared by charging preheated phenol and preheated formaldehyde in the mole ratio of 1:2.25 into a vessel. The formaldehyde is preheated to about 60 °C and the phenol is preheated to a temperature above 41°C, i.e., about 45°C. The temperature of phenol and formaldehyde solution is cooled to 40°-50°C and 0.1-1.3 % of calcium hydroxide is added. The phenol-formaldehyde solution is cooled so that when the catalyst is added, it is easier to control the exotherm. After adjusting pH of the solution to the alkaline side of about 7.5 to 9.5, the solution is heated to develop a slight exotherm of up to several degrees Centigrate per minute. Heating is terminated and the temperature of the solution is allowed to rise to about 70°-80°C which temperature is maintained until a free formaldehyde content in the solution of 3-9.5 percent is attained. The time interval between adjustment of the pH of the solution to a value within the range of 7.5-9.5 to the point when the desired free formaldehyde content is achieved, is generally from 60 to 90 minutes.

The solution is continued to be maintained at about 70°-80C until a water tolerance of 320-340 percent is attained, following which, the solution is cooled to 45°-65C, neutralized with an aqueous phosphoric acid solution to a pH of 5.0 - 6.0 and vacuum stripped to a refractive index of 1.45-1.65. Total distillation time is about 2-5 hours. The reason for cooling the resin to 45°-65C is for the purpose of controlling molecular weight of the phenol-formaldehyde resin. Neutralizing the resin to a pH of 5-6 prolongs the stability of the resin significantly.

It has been observed that when the hold temperature during the condensation reaction is maintained at 75°C-77°C, a resin is obtained which exhibits superior qualities. Although the optimum temperature is in the range of 75°-77°C, temperatures outside of this range will not significantly affect the quality of the resin. Suitable temperature in this instance is between 70°C and 90°C.

Monomeric furfuryl alcohol is added to the phenol-formaldehyde polymer in an amount of 34 percent, based on the weight of the resin, with mixing, and the resulting product is cooled to room temperature. The binder contains about 75 percent solids, has a viscosity in the range of 400-600 cp, water tolerance of 125-300 percent and free phenol of 4-7 percent. The pH of the binder is in the range of 4.7-5.3.

In preparing a sand molding composition and a foundry sand mold therefrom, 2 percent of the binder, based on the weight of sand used, and about 20 percent of a curing agent, based on the weight of the binder, are mixed with sand at room temperature. The pattern box is pre-heated to 350°-600°F and the sand molding composition is blown thereinto. The resin cures very quickly and the sand mold is ready to be extracted from the pattern in 5 to 25 seconds. Although it is preferred to first mull sand and curing agent and then add binder and mull this mixture, a pre-mix of binder and curing agent may be added to sand and this mixture may then be mulled.

A number of examples of the invention described herein are given below. It should be understood that these examples are presented for illustrative purposes only.

EXAMPLES 1

This example illustrates the preparation of a binder which consists of phenol-formaldehyde and furfuryl alcohol. The phenol-formaldehyde resin was prepared by charging preheated phenol and preheated 50 percent aqueous solution of formaldehyde to a vessel in the mole ratio of 1:1.78. The temperature of phenol was 45°C and that of formaldehyde, 60°C.

The contents of the vessel were cooled to 45°C and 1.8 percent, based on the weight of phenol and formaldehyde, of a 50 percent aqueous solution of sodium hydroxide was added. After adjusting the pH of solution to 9.0, the solution was heated to 75°C and maintained at about 75°C until free formaldehyde of 4.22 percent and a water tolerance of 320 percent was attained. Preparation to this point took about 3 hours.

The pH of the solution was adjusted with HCl to 5.0 and the solution was vacuum-stripped to a refractive index of 1.55. Duration of the distillation was about 3 ½ hours. Preparation of the binder was completed by adding, with agitation, 15 percent, by weight of resin, of furfuryl alcohol.

EXAMPLE 2

In this example, the binder was prepared by charging preheated phenol and preheated 44 percent aqueous formaldehyde solution to a vessel. The solution was cooled to about 45°C and 0.3 percent of powdered calcium hydroxide was added. The amount of calcium hydroxide was based on combined weight of phenol and formaldehyde. After adjusting the pH of solution to 9.0, the solution was heated to about 75°C and maintained at that temperature until the free formaldehyde of 8.0 percent and water tolerance of 340 percent was reached. The solution was cooled to 60°C, neutralized to a pH of 5.3 with 25 percent phosphoric acid and vacuum-stripped to a refractive index of 1.58. Based on the combined weight of the resin, 15 percent of furfuryl alcohol was added with agitation. Agitation was continued for about 15 minutes and the binder was then cooled to room temperature.

Two batches of coated sand composition were prepared by adding 4,540 grams of Belrose silica sand and 13.6 grams of a curing agent to a muller. This mixture was mulled for 1 minute. One batch was prepared with aluminum chloride curing agent while the other, with chromium nitrate. Composition of the curing agents is given below.

I.
a. 38 of 50 percent aqueous solution of chromium nitrate,
b. 38 percent urea, and
c. 24 percent water.

II.
a. 38 of 50 percent aqueous aluminum chloride solution,
b. 38 percent urea, and
c. 24 percent water.

68.1 grams of the binder prepared above was added to each batch of the sand and converter mixture in the muller and this mixture was mulled for two minutes.

The coated sand mixture was removed from the muller and blown into a pattern maintained at 475°F to produce 1- inch dog bone specimens.

The specimens were tested on the Detiert tensile tester to provide cold tensile strength and hot tensile strength data. The hot tensile strength data was obtained on dog bone specimens as they were extracted from the pattern. The cold tensile strength data was obtained on specimens which were cooled to room temperature prior to being subjected to tensile tests. The results of these tensile tests are tabulated below, where each value represents an average of three tests:

|  | Hot Tensile Strength (psi) Curing time, in seconds | | | |
|---|---|---|---|---|
|  | 35 | | | |
| AlCl$_3$ | 75 | | | |
| Cr(NO$_3$)$_3$ | 82.5 | | | |
|  | Cold Tensile Strength (psi) Curing Time, in seconds | | | |
|  | 5 | 10 | 20 | 30 |
| AlCl$_3$ | 185 | 350 | 405 | 358 |
| Cr(NO$_3$)$_3$ | 193 | 318 | 340 | 338 |

The dog bone specimens were also tested for humidity effect on their tensile strengths. In this test, the specimens were placed in a cabinet maintained at 75°F and 100 percent relative humidity. The values in the column identified as "initial" indicate the tensile strength of the specimens which were cured for 35 seconds and which were cooled to room temperature prior to testing.

| Tensile Strength under Humid Conditions (psi) | | | |
|---|---|---|---|
|  | initial | 2 hours | 4 hours |
| AlCl$_3$ | 322 | 232 | 177 |
| Cr(NO$_3$)$_3$ | 357 | 270 | 223 |

EXAMPLE 3

In this example, the binder and the coated sand mixture were prepared in the manner described in Example 2 with the exception that 40 percent of furfuryl alcohol was added to the phenol-formaldehyde resin. The curing agent used in this example was the chromium nitrate curing agent of Example 2. The data is given below.

Hot Tensile Strength (psi)
Curing Time, in seconds
35
75
Cold Tensile Strength (psi)
Curing Time, in seconds
5       10      20      30
157     318     413     395

The same humidity test was performed as in Example 3 with the following results:

Tensile Strength Under Humid Conditions (psi)
initial    2 hours    4 hours    6 hours    8 hours
375        337        327        303        268

EXAMPLE 4

In this example, the binder and the coated sand mixture were prepared in accordance with Case U.S. Pat. no. 3,312,650. The percentage given is percentage by weight of the total composition, unless otherwise indicated.

6.28 percent of furfuryl alcohol, 25.14 percent of phenol, 0.04 percent of maleic anyhdride and 3.14 percent of water were charged to a vessel and refluxed at 110°C for 90 minutes. Maleic anhydride served as a catalyst. Then, 0.34 percent of sodium hydroxide was charged to the vessel and the mixture was cooled to 65°C. After charging to the kettle 37.17 percent of a 37 percent aqueous formaldehyde solution, the mixture was maintained at 65°C for about 35 minutes until a free formaldehyde content of about 6 percent was attained. The pH of the mixture was adjusted to 5.7 by addition of 0.29 percent of HCl and 0.59 percent of water, and the solution was vacuum-stripped to Z viscosity. Preparation of the binder was completed with addition of 26.46 percent of furfuryl alcohol. The solution was mixed for about 15 minutes and cooled to room temperature.

The coated sand mixture was prepared by adding to the muller 4,000 grams of Belrose sand and 20 percent of an aluminum chloride curing agent, based on the weight of the binder, and mulling this mixture for one minute. Following this, 1.5 percent of the binder prepared above, based on the sand, was added to the sand and curing agent mixture in the muller, and this mixture was mulled for 2 minutes. The curing agent consisted of:
a. 38 of a 50 percent aqueous aluminum chloride solution,
b. 38 percent urea, and
c. 24 percent water The dog bone specimens were prepared as in Example 2 and tensile tests were made thereon. The following data was obtained:

Hot Tensile Strength (psi)
Curing Time, in seconds
35
44
Cold Tensile Strength (psi)
Curing Time, in seconds
5       10      20      30
44      212     355     358

The same humidity test was preformed on these specimens as in Example 3 with the following results:

Tensile Strength Under Humid Conditions (psi)
initial    2 hours    4 hours
353        210        0 psi.

In regards to the above tests, of great significance is the humidity test which showed that after being subjected to 100 percent relative humidity at 75°F for 4 hours, the tensile strength of the dog bone specimens was 0. This indicates that the specimens disintegrated after a period of 4 hours under test conditions. This fact is in sharp contrast to the results obtained on dog bone specimens made with composition and pursuant to the method of invention described herein.

We claim:

1. A method for production of foundry molds wherein the curing time of the molding mixture is less than 60 seconds comprising heating a mold box to a temperature in the range of 350° to 600°F.;

charging to the mold box a mixture comprising sand; from 1.5 to 3 percent, based on the weight of sand, of a binder comprising a phenol-formaldehyde resole resin of P/F ratio 1:1 to 1:3 prepared in the presence of 0.005 to 4.5 percent of a basic catalyst, based on the combined weight of phenol and formaldehyde, said resin being modified with 25 to 45 percent, based on the weight of said resin, of a substance selected from furfural and furfuryl alcohol; and from 12 to 25 percent, based on the weight of said binder, of an acidic curing agent comprising chromium nitrate;

curing said mixture while in contact with the mold box;

and extracting a cured mold from the mold box.

2. Method of claim 1 wherein said curing agent includes 7 to 25 percent chromium nitrate, 15 to 45 percent urea, and 30 to 48 percent water.

* * * * *